US011163531B2

(12) United States Patent
Haiut et al.

(10) Patent No.: US 11,163,531 B2
(45) Date of Patent: Nov. 2, 2021

(54) MULTIPLY AND ACCUMULATE (MAC) UNIT AND A METHOD OF ADDING NUMBERS

(71) Applicant: DSP GROUP LTD., Herzliya (IL)

(72) Inventors: Moshe Haiut, Ramat Gan (IL); Assaf Ganor, Herzelia (IL)

(73) Assignee: DSP GROUP LTD., Herzliya (IL)

( * ) Notice: Subject to any disclaimer, the term of this patent is extended or adjusted under 35 U.S.C. 154(b) by 83 days.

(21) Appl. No.: 16/447,966

(22) Filed: Jun. 21, 2019

(65) Prior Publication Data
US 2020/0034117 A1  Jan. 30, 2020

Related U.S. Application Data

(60) Provisional application No. 62/711,479, filed on Jul. 28, 2018.

(51) Int. Cl.
*G06F 7/544* (2006.01)
*G06F 7/498* (2006.01)

(52) U.S. Cl.
CPC .......... *G06F 7/5443* (2013.01); *G06F 7/4981* (2013.01); *G06F 7/4983* (2013.01)

(58) Field of Classification Search
CPC . G06F 7/5443; G06F 7/57; G06F 7/50; G06F 7/575; G06F 7/523; G06F 7/4981; G06F 7/4983; G06F 7/485; G06F 7/487; G06F 7/4876
See application file for complete search history.

(56) References Cited

U.S. PATENT DOCUMENTS

| 5,241,493 | A | * | 8/1993 | Chu | G06F 7/5443 708/501 |
| 5,892,698 | A | * | 4/1999 | Naffziger | G06F 7/5443 708/501 |
| 6,415,311 | B1 | * | 7/2002 | Purcell | G06F 7/5443 708/523 |
| 6,446,104 | B1 | * | 9/2002 | Tzeng | G06F 7/4876 708/503 |
| 7,490,119 | B2 | * | 2/2009 | Dhong | G06F 7/483 708/501 |
| 8,046,399 | B1 | * | 10/2011 | Inaganti | G06F 7/483 708/501 |
| 8,645,450 | B1 | * | 2/2014 | Choe | G06F 7/483 708/523 |

(Continued)

*Primary Examiner* — Aimee Li
*Assistant Examiner* — Carlo Waje
(74) *Attorney, Agent, or Firm* — Reches Patent

(57) ABSTRACT

A method and a MAC unit that may include accumulation unit and a multiplier. A accumulation unit that includes a first part, a second part and a third part. The first part may calculate a truncated sum. The second part may be configured to (a) receive, during each calculation cycle, a carry out of an add operation performed during a calculation cycle, (b) receive a sign bit of an intermediate product calculated during the calculation cycle; and (c) calculate, by the counter logic, a counter logic value, and (d) convert, after a start of a last calculation cycle of the calculation cycles, an output value of the counter logic to an intermediate value having a two's complement format. The third part may be configured to calculate an output value of the MAC unit based on the intermediate value and a truncated sum calculated by the first part of the accumulation unit.

17 Claims, 4 Drawing Sheets

(56) References Cited

U.S. PATENT DOCUMENTS

2006/0184601 A1\* 8/2006 Trong ............... G06F 7/483
708/495
2015/0095388 A1\* 4/2015 Vezier ............ G06F 7/5443
708/209

\* cited by examiner

PRIOR ART

MULTIPLY AND ACCUMULATE (MAC) UNIT AND A METHOD OF ADDING NUMBERS

BACKGROUND OF THE INVENTION

Figure 1:
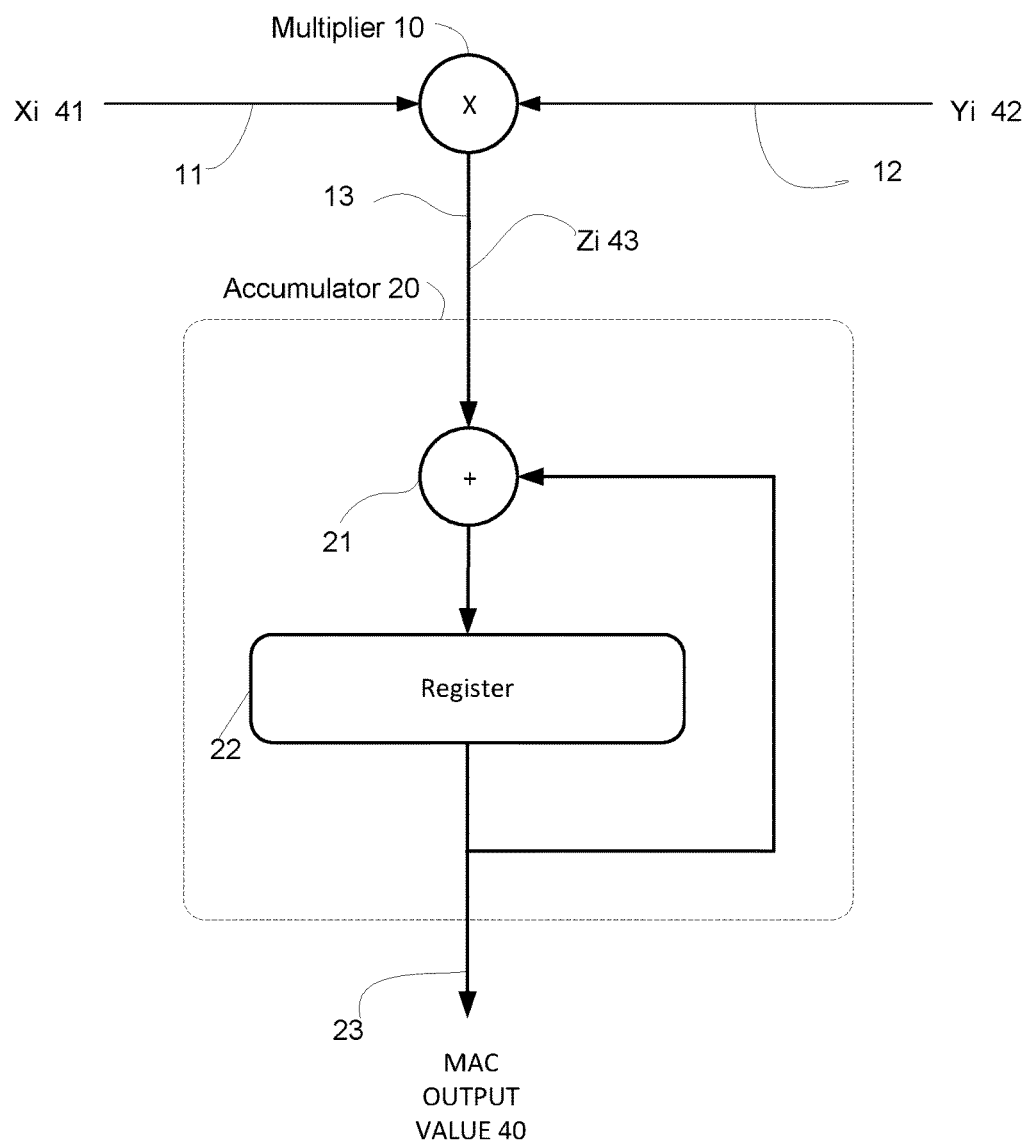

A conventional MAC architecture is made of two units: a multiplier and an accumulator. A series of K input data ($X_i$, $Y_i$) is fed into the multiplier, which produces a series of multiplies $Z_i = X_i * Y_i$. The role of the accumulator is to produce the final output $\Sigma Z_i$ where the index i runs from 1 to K. This is depicted in FIG. 1. Multiplier 10 has first input 11 for receiving $X_i$ 41, second input 12 for receiving $Y_i$ 42 and output 13 for outputting $Z_i$ 43. Accumulator 20 includes adder 21 and register 22. Adder 21 has a first input for receiving $Z_i$ 13, a second input for receiving an output value of register 12, and during M iteration the adder and registers calculate a sum of $Z_i$ ($\Sigma Z_i$) denoted MAC output value 40. MAC output value 40 is outputted by output 23 of the MAC unit.

Assuming that $X_i$ and $Y_i$ are signed integers of N bits each (including the sign bit), then the multiply $Z_i$ is normally a signed integer of 2*N bits. Assuming that the input series ($X_i$, $Y_i$) may contain up to $2^M$ ($K=2^M$) elements, then the adder and register of the accumulator must contain at least 2N+M bits to prevent overflow/underflow in worst-case conditions.

For example—a MAC unit with N=16, M=32 can accumulate up to 4,294,967,296 ($=2^{32}$) multiplies of two 16-bit signed numbers with no overflow/underflow of the resulted value. In this MAC unit the register contains 64 flip-flops, and the adder is 64-bit long 2'sc adder (where the $Z_i$ multiplies are converted from 32-bit to 64-bit by sign extension).

M may be very big, and the MAC unit can consume a significant amount of power.

There is a growing need to reduce the power consumption of the MAC unit.

SUMMARY

There may be provided a multiply and accumulate (MAC) unit that may include an accumulation unit that may include a first part, a second part, and a third part; and a multiplier; wherein the multiplier may be configured to perform multiple multiplication operations, during multiple calculation cycles; wherein during each calculation cycle the multiplier may be configured to multiply a first variable of a two's complement format by a second variable of the two's complement format to provide an intermediate product; wherein the first part of the accumulation unit may include an accumulation circuit that may be configured to (a) calculate, during each calculation cycle, a truncated sum of intermediate products calculated till the calculation cycle; and (b) output, during each calculation cycle, a carry out of an add operation performed during the calculation cycle; wherein the second part of the accumulation unit may include counter logic and additional logic; wherein the second part of the accumulation unit may be configured to (a) receive, during each calculation cycle, the carry out of an add operation performed during the calculation cycle, (b) receive a sign bit of an intermediate product calculated during the calculation cycle; and (c) calculate, by the counter logic, a counter logic value; wherein the second part may be configured to convert, after a start of a last calculation cycle of the calculation cycles, an output value of the counter logic to a intermediate value having a two's complement format; and wherein the third part of the accumulation unit may be configured to calculate an output value of the MAC unit based on the intermediate value and the truncated sum.

The counter logic may be a Gray counter logic that may include at least one Gray counter.

The counter logic may include at least one counter that differs from a Gray counter.

The third part of the accumulation unit may be a concatenation circuit that may be configured to concatenate the intermediate value and the truncated sum to provide the output value of the MAC unit.

The counter logic may consist of a single Gray counter.

The counter logic may include serially connected independent Gray counters.

The additional logic may include an up-down logic that may be configured to control the counter logic by determining, per each calculation cycle, whether the one or counters counts upwards, counts downwards or holds.

The up-down logic may be configured to control the counter logic, during each calculation cycle, based on at least (i) the carry out of the calculation cycle, (ii) the sign bit of the intermediate product of the calculation cycle, and (ii) an output value of the counter logic during the calculation cycle.

The additional logic further may include a sign bit flip flop.

There may be provided a method for multiplying and accumulating, the method may include performing, by a multiplier of a multiply and accumulate (MAC) unit, multiple multiplication operations, during multiple calculation cycles; wherein a performing of each multiplication operation may include multiplying a first variable of a two's complement format by a second variable of the two's complement format to provide an intermediate product; calculating, by a first part of an accumulation unit of the MAC unit and during each calculation cycle, a truncated sum of intermediate products calculated till the calculation cycle; outputting, by a first part of an accumulation unit of the MAC unit and during each calculation cycle, a carry out of an add operation performed during the calculation cycle; receiving, by a second part of the accumulation unit and during each calculation cycle, (a) the carry out of an add operation performed during the calculation cycle, and (b) a sign bit of an intermediate product calculated during the calculation cycle; calculating, by a counter logic of the second part of the accumulation unit and during each calculation cycle, a counter logic value; converting, by the second part of the accumulation unit and after a start of a last calculation cycle of the calculation cycles, an output value of the counter logic to a intermediate value having a two's complement format; and calculating, by a third part of the accumulation unit, an output value of the MAC unit based on the intermediate value and the truncated sum.

The third part of the accumulation unit may be a concatenation circuit and the method may include concatenating the intermediate value and the truncated sum to provide the output value of the MAC unit.

The additional logic may include an up-down logic, wherein the method may include controlling the counter logic by determining, per each calculation cycle, whether the one or counters counts upwards, counts downwards or holds.

The method may include controlling, by the up-down logic, the counter logic, during each calculation cycle, based on at least (i) the carry out of the calculation cycle, (ii) the sign bit of the intermediate product of the calculation cycle, and (ii) an output value of the counter logic during the calculation cycle.

BRIEF DESCRIPTION OF THE INVENTION

Figure 2:
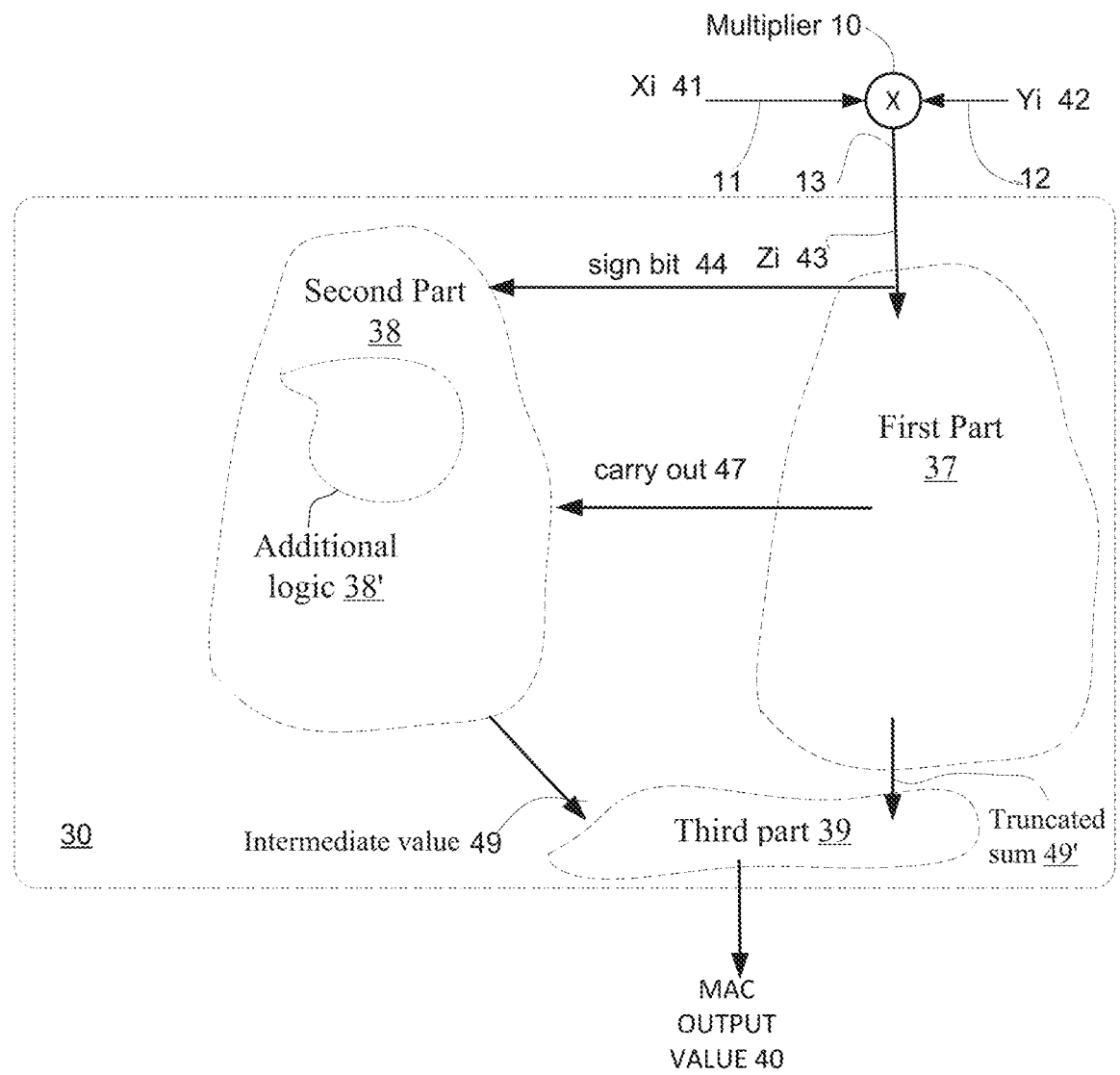
Figure 3:
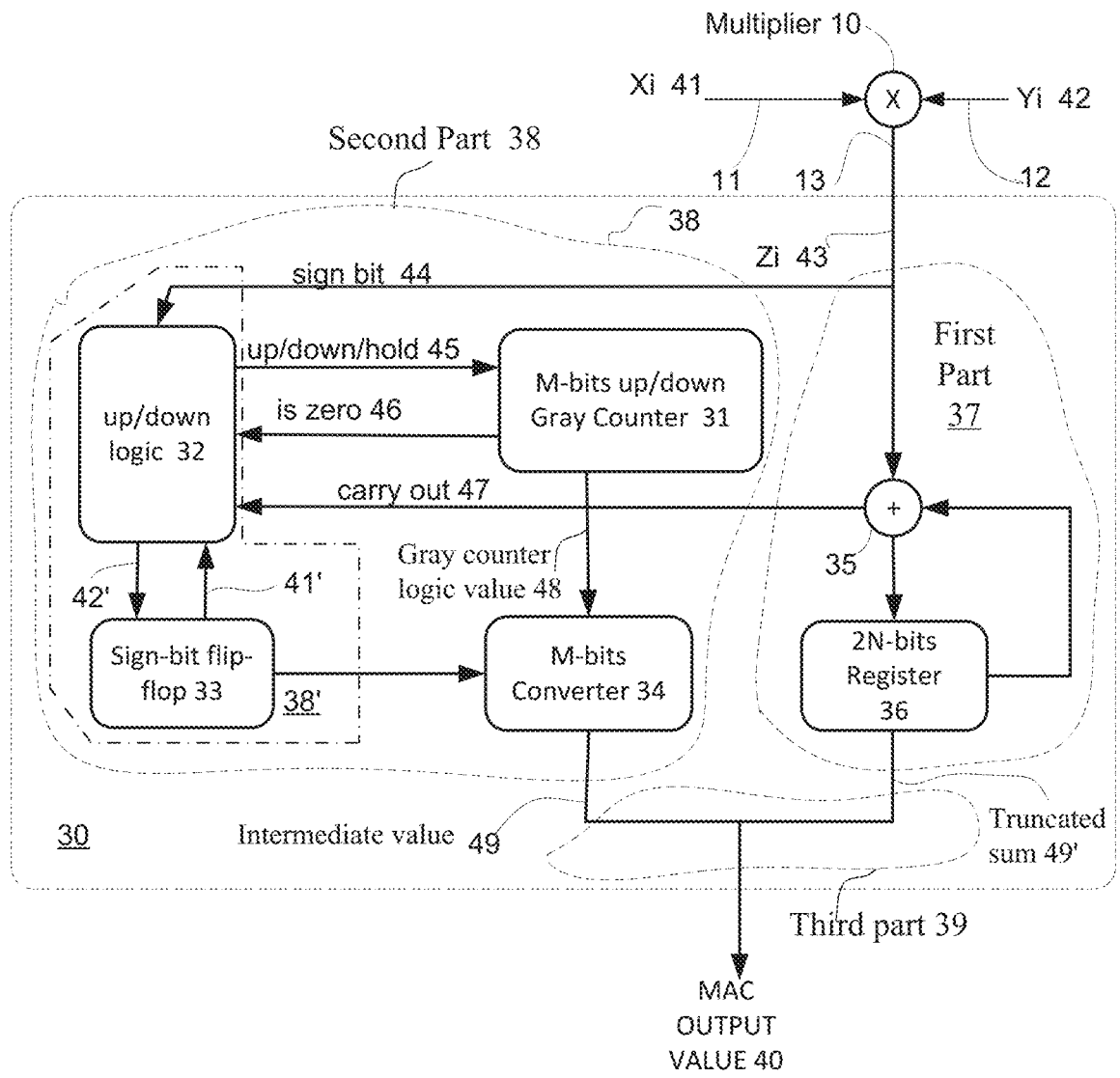
Figure 4:
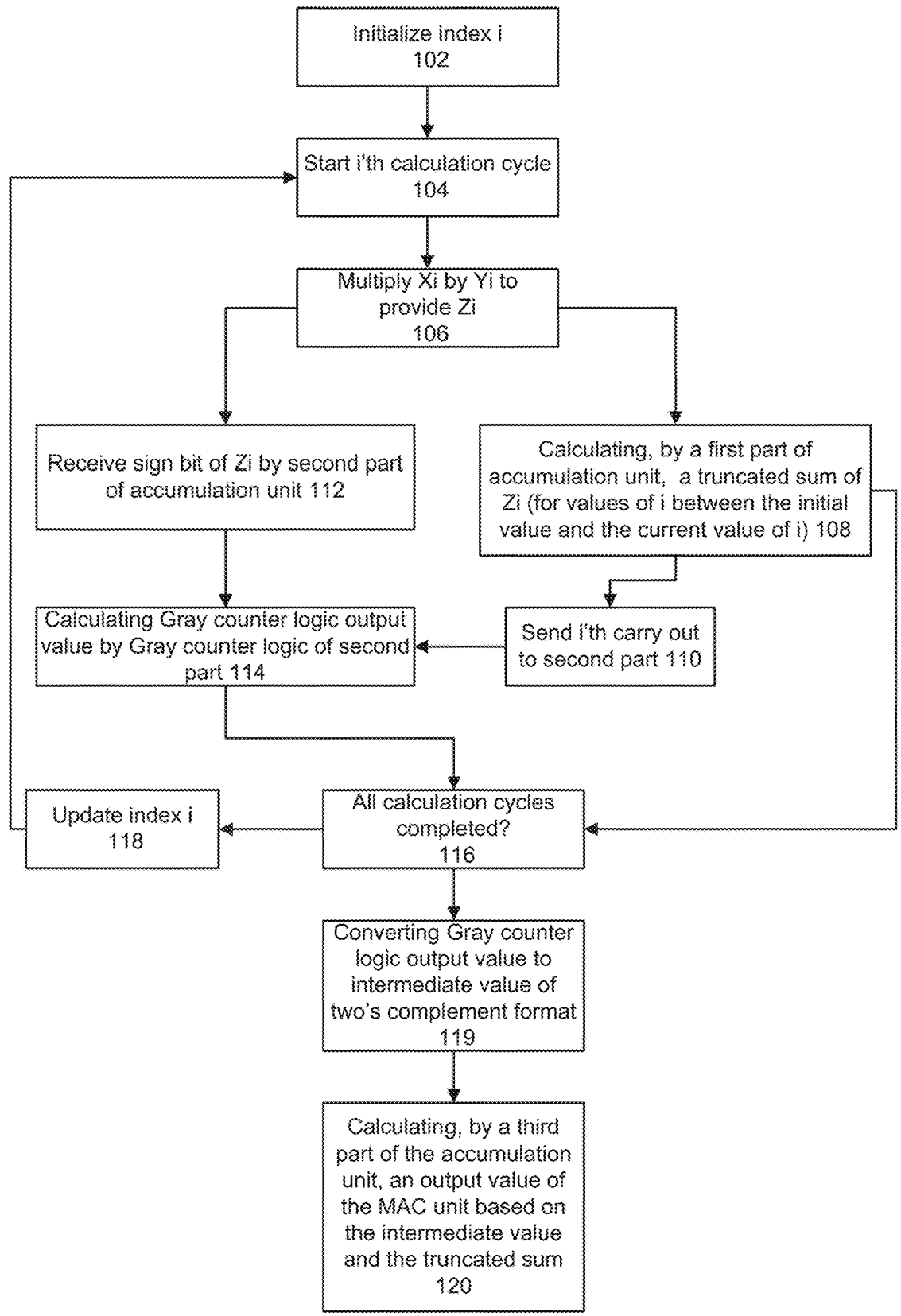

The present invention will be understood and appreciated more fully from the following detailed description taken in conjunction with the drawings in which:

FIG. 1 illustrates a prior art MAC unit;
FIG. 2 illustrates an example of a MAC unit;
FIG. 3 illustrates an example of a MAC unit; and
FIG. 4 illustrates an example of a method.

DETAILED DESCRIPTION OF THE INVENTION

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

All values and/or variables illustrated below (for example—sampling rate) are merely non-limiting examples of values and/or variables.

Any example in the specification is a non-limiting example.

The terms "having", "comprising", "consisting", "consisting essentially of"—and any of their derivatives—are used in an interchangeable manner. Any combination of components may be a closed list, an open list of an almost open list of components.

The following text may refer to a Gray counter and/or to a Gray counter logic. It should be noted that the Gray counter may be replaced by another counter (for example a binary counter) and that the Gray counter logic may be replaced by a counter logic that differs from a Gray counter logic. Gray counter provided high accuracy but may be replaced by other counters.

It has been found that in many cases—and in particular during huge MAC calculations in applications that use neural network—the resulted $Z_i$ multiplies change sign from time to time.

As $Z_i$ is represented in 2'sc format, the sign bit is then re-extended every time when the sign-bit changes. Similarly, the intermediate result in the adder output and in the register change sign from time to time. This is also represented in 2'sc format, hence the sign bit is re-extended every time when the sign-bit changes.

The said logic transitions due to sign-extension consume significant power in both the combinatorial logic (e.g. in the adder) and the register flip-flops.

Example a MAC unit with N=16, M=32 makes accumulation of 16 simulated multiplies of random numbers as listed in Table 1 below. In this simulation the total number of flip-flops transitions in the output register was 586, out of which 388 transactions were due to sign-bit extension.

In table 1 the change of bits due to the sign-bit extension are underlined and each sums (right column) is represented by an upper sequence of bits and a lower sequences of bits—wherein the upper sequence of bits is more significant that the lower sequence of bits.

| i | $X_i$ | $Y_i$ | $Z_i = X_i * Y_i$ | $\Sigma Z_i$ | $\Sigma Z_i$ at 2'sc format binary representation |
|---|---|---|---|---|---|
| 1 | 574 | 2476 | 1421224 | 1421224 | 00000000000000000000000000000000 0000 0000 0001 0101 1010 1111 1010 1000 |
| 2 | −456 | −12 | 5472 | 1426696 | 00000000000000000000000000000000 0000 0000 0001 0101 1100 0101 0000 1000 |
| 3 | −2978 | 1499 | −4464022 | −3037326 | <u>11111111111111111111111111111111 1111 1111 1</u>101 0001 1010 0111 0111 0010 |
| 4 | −4589 | −3900 | 17897100 | 14859774 | <u>00000000000000000000000000000000 0000 0000</u> 1110 0010 1011 1101 1111 1110 |
| 5 | 17 | 77 | 1309 | 14861083 | 00000000000000000000000000000000 0000 0000 1110 0010 1100 0011 0001 1011 |
| 6 | 23633 | 9877 | 233423141 | 248284224 | 00000000000000000000000000000000 0000 1110 1100 1100 1000 0100 0100 0000 |
| 7 | −30455 | 12376 | −376911080 | −128626856 | <u>11111111111111111111111111111111 1111</u> 1000 0101 0101 0100 1111 0101 1000 |
| 8 | 15777 | 11002 | 173578554 | 44951698 | <u>00000000000000000000000000000000 0000 00</u>10 1010 1101 1110 1000 1001 0010 |
| 9 | 11567 | −3898 | −45088166 | −136468 | <u>11111111111111111111111111111111 1111 1111 1111 1</u>101 1110 1010 1110 1100 |
| 10 | 74444 | 45 | 3349980 | 3213512 | <u>00000000000000000000000000000000 0000 0000 0</u>011 0001 0000 1000 1100 1000 |
| 11 | −1 | −4444 | 4444 | 3217956 | 00000000000000000000000000000000 0000 0000 0011 0001 0001 1010 0010 0100 |
| 12 | −27546 | 1385 | −38151210 | −34933254 | <u>11111111111111111111111111111111 1111 1</u>101 1110 1010 1111 0101 1111 1010 |
| 13 | 15944 | −1455 | −23198520 | −58131774 | 11111111111111111111111111111111 1111 1100 1000 1000 1111 1010 1100 0010 |
| 14 | 19345 | 21893 | 423520085 | 365388311 | <u>00000000000000000000000000000000 0001</u> 0101 1100 0111 0110 0010 0001 0111 |
| 15 | −16389 | 30518 | −500159502 | −134771191 | <u>11111111111111111111111111111111 1111 0111 1111</u> 0111 1000 1110 0000 1001 |
| 16 | 31278 | 12001 | 375367278 | 240596087 | <u>00000000000000000000000000000000 0000</u> 1110 0101 0111 0011 0100 0111 0111 |

Accordingly—more than 60% of the dynamic power consumption of the accumulator logic (both adder output and register) was spent on sign bit extension.

There is provided a MAC unit that eliminates the redundant operation of sign extension, which may save significant power during huge MAC operations.

FIG. 2 illustrates an example of a MAC unit 50.

MAC unit 50 includes multiplier 10 and an accumulation unit 30 that includes first part 37, second part 38, and third part 39.

Multiplier 10 is configured to perform multiple K multiplication operations, during multiple calculation cycles.

During each calculation cycle (for example the i'th calculation cycle, index i ranges between 1 and K) the multiplier 10 is configured to multiply a first variable (Xi 42) of a two's complement format by a second variable (Yi 42) of the two's complement format to provide an intermediate product Zi 43).

Xi and Yi may be of the same length or may differ from each other by length.

Different lengths of Xi and Yi may require different partitions between the first and second parts of the accumulation unit—or using different accumulations units with different partitions.

It is assumed that Zi is 2N bits long.

The first part 37 of the accumulation unit 30 may include an accumulation circuit (not shown) that is configured to (a) calculate, during each calculation cycle, a truncated sum 49' of intermediate products calculated till the calculation cycle (sum of Zi, for values of i that range from an initial value of i to the current value of i); and (b) output, during each calculation cycle, a carry out 47 of an add operation performed during the calculation cycle.

The sum is referred to as truncated sum because the length of the truncated sum is limited to the length (2N) of the intermediate product.

A second part 38 of the accumulation unit 30 may include a Gray counter logic 31 and additional logic 38'. The second part calculates the more significant part of the output value—for example the M'th most significant bits.

The second part 38 of the accumulation unit may be configured to (a) receive, during each calculation cycle, the carry out 47 of an add operation performed during the i'th calculation cycle, (b) receive a sign bit 44 of Zi; and (c) calculate, by the Gray counter logic, a Gray counter logic value 48.

The Gray counter logic 48 may include one or more Gray counters. Multiple Gray counter may be serially connected to each other in order to reduce the required hardware.

The second part 38 is configured to convert, after a start of a last calculation cycle of the calculation cycles (the $K^{th}$ calculation cycle) an output value of the Gray counter logic to an intermediate value 49 having a two's complement format.

A third part 39 of the accumulation unit may be configured to calculate an output value 40 of the MAC unit based on the intermediate value and the truncated sum FIG. 3 illustrates an example of a MAC unit 50.

First part 37 of accumulation unit 30 includes adder 35 and 2N bits register 36. Second part 38 of accumulation unit 30 includes converter 34, up/down Gray counter 31, sign-bit flip-flop 33, and up/down logic 32. Third part 39 is a concatenating unit.

Assuming that the output from the multiplier is a signed integer of 2N bit (including the sign bit), the smart accumulator is made of two parts: first part is for the 2N least-significant bits, and second one is for the M most-significant bits.

The outputs from these two parts are concatenated to produce the 2N+M output of the MAC unit.

This MAC unit can save much of the power consumption that would be spent for the sign-extension transitions in the M most-significant bits.

The 2N least-significant part by itself can also change sign from time to time, and some of its bits may be used for sign extension from time to time. Anyway, the invention does not try to save the power consumption that is spent on the sign extension of this part, because it requires a too complicated solution.

The MAC unit save 310 out of the 388 sign-bit extension transactions of the example that was given in Table 1. This would save more than 50% of the accumulator dynamic power consumption.

The 2N least-significant part of the smart accumulator may operate like the least 2N bits of the MAC unit of FIG. 1.

There are two output signals that the first part provides to the second part of the smart accumulator: the multiply sign bit (sign bit of Zi) 44 and the carry-out bit 47 from the 2N bits adder. These two bits are provided per each multiply operation.

The second part 38 is responsible for the M most-significant bits of the accumulation. This second part does not use the "2'sc" representation for this field of M bits.

Instead, it uses a representation of "sign and magnitude"—that is to say the sign-bit and the absolute value. The second part may include the following components:

Sign-bit flip-flop 33 is a single flip-flop that determines the sign-bit of current MAC result ('0' represents a positive MAC value, while '1' represents a negative MAC value).

Up/down Gray Counter 31 can count up or down or maintain its current value—according to its control input up/down/hold. The counter value is always a positive integer, and it represents the absolute value of the most-significant M-bits of the MAC result. The counter uses Gray code in order to minimize the number of flip-flop transitions (it always makes one transition per count).

Converter 34 is a combinatorial logic that is only enabled at the end of the whole MAC process (when the final MAC result is to be output). As long as the converter is not enabled it does not consume power. The converter may convert a given Gray code from the counter into a positive or a negative binary code—depending on the MAC sign bit. It is known in the art that conversion from Gray code to binary code can be made using M−1 exclusive-or gates. An additional M-bit half-adder is required to negate the positive binary value into 2'sc negative representation in case that the MAC sign-bit is '1' (i.e. negative MAC result).

Up/down logic 32 is a combinatorial logic that determines if the counter should count up or down or maintain its current value. Also, the Up/down logic determines the new polarity of the MAC sign bit. The Up/down logic considers the following inputs: flip-flop sign-bit, Zi sign-bit 44, carry-out 47, and whether or not the value of the Gray counter (is zero 46) equals 0. The truth tables for the Up/down logic are specified in Table 2 below:

| INPUTS | | | | OUTPUTS | |
|---|---|---|---|---|---|
| Sign bit 44 | Flip-flop sign bit 41' | Carry out 47 | is zero 46 | up/down/hold 45 | sign bit flip-flop 42' |
| 0 | 0 | 0 | no | hold | 0 |
| 0 | 0 | 1 | no | up | 0 |
| 0 | 1 | 0 | no | hold | 1 |
| 0 | 1 | 1 | no | down | 1 |
| 1 | 0 | 0 | no | hold | 0 |
| 1 | 0 | 1 | no | down | 0 |
| 1 | 1 | 0 | no | hold | 1 |
| 1 | 1 | 1 | no | up | 1 |
| 0 | 0 | 0 | yes | hold | 0 |
| 0 | 0 | 1 | yes | up | 0 |
| 0 | 1 | 0 | yes | hold | 1 |
| 0 | 1 | 1 | yes | up | 0 |
| 1 | 0 | 0 | yes | hold | 0 |
| 1 | 0 | 1 | yes | up | 1 |
| 1 | 1 | 0 | yes | hold | 1 |
| 1 | 1 | 1 | yes | up | 1 |

Therefore—instead of flipping a large number of bits due to a sign-bit change—the suggested MAC unit manipulates a much smaller number of bits—and the power consumption is greatly reduced.

There may be provided a method for operating the mentioned above MAC unit. The method may including performing multiplications and accumulation using the mentioned above MAC unit.

FIG. 4 illustrates an example of method 100.

Method 100 may include:

a. Step 102 of initializing index i (setting I to an initial value such as one or zero).

b. Step 104 of starting an i'th calculation cycle. Step 104 may be preceded by step 102.

c. Step 106 of multiplying Xi by Yi to generate Zi. Xi, Yi and Zi have a two's complement format. Zi is referred to as an intermediate product. Step 106 may be preceded by step 104.

d. Step 108 of calculating, by a first part of an accumulation unit (of the MAC unit) a truncated sum of Zi. Step 108 may be preceded by step 106.

e. Step 110 of sending, by the first part and to the second part of the accumulation unit, an i'th carry out of an add operation performed during the i'th calculation cycle. Step 110 may be preceded by step 108.

f. Step 112 of receiving, by the second part and during the i'th calculation cycle, the sign bit of Zi. Step 112 may be preceded by step 106.

g. Step 114 of calculating, by a Gray counter logic of the second part, a i'th Gray counter logic value. Step 114 may be preceded by step 110 and by step 112.

h. Step 116 of checking if all calculation cycles ended if the value of i reached its final value (for example the initial value plus K). Step 116 may be preceded by step 114. If yes—jumping to step 118 of updating index I (for example i=i+1). If no-jumping to step 119.

i. Step 119 of converting, by the second part, an output value of the Gray counter logic to an intermediate value having a two's complement format. Step 119 may be followed by step 120.

j. Step 120 of calculating, by a third part of the accumulation unit, an output value of the MAC unit based on the intermediate value and the truncated sum.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps than those listed. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A multiply and accumulate (MAC) unit, comprising:

an accumulation unit that comprises a first part, a second part, and a third part; and a multiplier;

wherein the multiplier is configured to perform multiple multiplication operations, during multiple calculation cycles;

wherein during each calculation cycle the multiplier is configured to multiply a first variable of a two's complement format by a second variable of the two's complement format to provide an intermediate product;

wherein the first part of the accumulation unit comprises an accumulation circuit that is configured to (a) calculate, during each calculation cycle, a truncated sum of intermediate products calculated till the calculation cycle; and (b) output, during each calculation cycle, a carry out of an add operation performed during the calculation cycle;

wherein the second part of the accumulation unit comprises counter logic and additional logic;

wherein the second part of the accumulation unit is configured to (a) receive, during each calculation cycle, the carry out of the add operation performed during the calculation cycle, (b) receive a sign bit of the intermediate product calculated during the calculation cycle; and (c) calculate, by the counter logic, a counter logic value;

wherein the second part is configured to convert, after a start of a last calculation cycle of the multiple calculation cycles, an output value of the counter logic to an intermediate value having a two's complement format; and wherein the third part of the accumulation unit is configured to calculate an output value of the MAC unit based on the intermediate value and the truncated sum.

2. The MAC unit according to claim 1, wherein the counter logic is a Gray counter logic that comprises at least one Gray counter.

3. The MAC unit according to claim 1, wherein the counter logic comprises at least one counter that differs from a Gray counter.

4. The MAC unit according to claim 1, wherein the counter logic consists of a single Gray counter.

5. The MAC unit according to claim 1, wherein the counter logic comprises serially connected independent Gray counters.

6. The MAC unit according to claim 1, wherein the additional logic comprises an up-down logic that is configured to control the counter logic by determining, per each calculation cycle, whether the counter logic counts upwards, counts downwards or holds.

7. The MAC unit according to claim 6, wherein the up-down logic is configured to control the counter logic, during each calculation cycle, based on at least (i) the carry out of the calculation cycle, (ii) the sign bit of the intermediate product of the calculation cycle, and (iii) an output value of the counter logic during the calculation cycle.

8. The MAC unit according to claim 4, wherein the additional logic further comprises a sign bit flip flop.

9. A method for multiplying and accumulating, the method comprises:

performing, by a multiplier of a multiply and accumulate (MAC) unit, multiple multiplication operations, during multiple calculation cycles; wherein a performing of each multiplication operation comprises multiplying a first variable of a two's complement format by a second variable of the two's complement format to provide an intermediate product;

calculating, by a first part of an accumulation unit of the MAC unit and during each calculation cycle, a truncated sum of intermediate products calculated till the calculation cycle;

outputting, by a first part of an accumulation unit of the MAC unit and during each calculation cycle, a carry out of an add operation performed during the calculation cycle;

receiving, by a second part of the accumulation unit and during each calculation cycle, (a) the carry out of the add operation performed during the calculation cycle, and (b) a sign bit of the intermediate product calculated during the calculation cycle;

calculating, by a counter logic of the second part of the accumulation unit and during each calculation cycle, a counter logic value;

converting, by the second part of the accumulation unit and after a start of a last calculation cycle of the multiple calculation cycles, an output value of the counter logic to an intermediate value having a two's complement format; and calculating, by a third part of the accumulation unit, an output value of the MAC unit based on the intermediate value and the truncated sum.

10. The method according to claim 9, wherein the counter logic is a Gray counter logic that comprises at least one Gray counter.

11. The method according to claim 9, wherein the counter logic comprises at least one counter that differs from a Gray counter.

12. The method according to claim 9, wherein the third part of the accumulation unit is a concatenation circuit and the method comprises concatenating the intermediate value and the truncated sum to provide the output value of the MAC unit.

13. The method according to claim 9, wherein the counter logic consists of a single Gray counter.

14. The method according to claim 9, wherein the counter logic comprises serially connected independent Gray counters.

15. The method according to claim 9, wherein the additional logic comprises an up-down logic, wherein the method comprises controlling the counter logic by determining, per each calculation cycle, whether the counter logic counts upwards, counts downwards or holds.

16. The method according to claim 15, comprises controlling, by the up-down logic, the counter logic, during each calculation cycle, based on at least (i) the carry out of the calculation cycle, (ii) the sign bit of the intermediate product of the calculation cycle, and (iii) an output value of the counter logic during the calculation cycle.

17. The method according to claim 15, wherein the additional logic further comprises a sign bit flip flop.

* * * * *